(12) United States Patent
Porcs et al.

(10) Patent No.: US 8,231,137 B2
(45) Date of Patent: Jul. 31, 2012

(54) KNEE AIRBAG HOUSING ASSEMBLY

(75) Inventors: Robert Anthony Porcs, Waterford, MI (US); Jeffrey Sadao Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 166 days.

(21) Appl. No.: 11/937,633

(22) Filed: Nov. 9, 2007

(65) Prior Publication Data

US 2009/0121458 A1 May 14, 2009

(51) Int. Cl.
*B60R 21/206* (2011.01)
*B60R 21/215* (2011.01)

(52) U.S. Cl. ............... 280/728.3; 280/730.1; 280/732

(58) Field of Classification Search ............ 280/728.3, 280/730.1, 732
See application file for complete search history.

(56) References Cited

U.S. PATENT DOCUMENTS

| | | | |
|---|---|---|---|
| 5,820,157 | A | 10/1998 | Matsumoto |
| 5,876,061 | A | 3/1999 | Stavermann |
| 6,193,271 | B1 | 2/2001 | Shimane |
| 6,345,837 | B1 | 2/2002 | Warnez et al. |
| 6,536,802 | B1 | 3/2003 | Sutherland et al. |
| 6,715,789 | B2 | 4/2004 | Mizuno et al. |
| 6,902,186 | B2 * | 6/2005 | Suzuki et al. ............ 280/730.1 |
| 7,029,026 | B2 * | 4/2006 | Morita ...................... 280/728.3 |
| 7,055,851 | B2 * | 6/2006 | Takimoto et al. ........ 280/730.1 |
| 7,175,195 | B2 | 2/2007 | Morita |
| 7,370,879 | B2 * | 5/2008 | Hotta et al. .............. 280/728.2 |
| 7,384,065 | B2 * | 6/2008 | Takimoto et al. ............ 280/732 |
| 2003/0132618 | A1 * | 7/2003 | Suzuki et al. ........... 280/730.1 |
| 2004/0124617 | A1 | 7/2004 | Morita |
| 2004/0262896 | A1 * | 12/2004 | Mizuno et al. .......... 280/730.1 |
| 2005/0006880 | A1 * | 1/2005 | Nakayama .............. 280/730.1 |
| 2005/0062265 | A1 * | 3/2005 | Hotta et al. .............. 280/730.1 |
| 2005/0073134 | A1 * | 4/2005 | Matsuura et al. ....... 280/730.1 |
| 2005/0140123 | A1 * | 6/2005 | Hotta et al. .............. 280/730.1 |
| 2005/0194767 | A1 | 9/2005 | Freisler et al. |
| 2005/0230939 | A1 * | 10/2005 | Abe et al. ................. 280/728.2 |
| 2006/0108780 | A1 * | 5/2006 | Hotta et al. ................. 280/732 |
| 2006/0279073 | A1 * | 12/2006 | Hotta et al. .............. 280/730.1 |
| 2007/0040360 | A1 * | 2/2007 | Riha et al. ................ 280/728.3 |
| 2007/0126212 | A1 * | 6/2007 | Takimoto et al. ....... 280/730.1 |
| 2007/0132215 | A1 * | 6/2007 | Takimoto et al. ....... 280/730.1 |
| 2007/0182134 | A1 * | 8/2007 | Mizuno et al. .......... 280/730.1 |
| 2007/0200322 | A1 * | 8/2007 | Sakakida ................. 280/730.1 |
| 2008/0100042 | A1 * | 5/2008 | Adachi et al. ........... 280/730.1 |

* cited by examiner

*Primary Examiner* — Toan C To
*Assistant Examiner* — Barry Gooden, Jr.
(74) *Attorney, Agent, or Firm* — Gifford, Krass, Sprinkle, Anderson & Citkowski, P.C.

(57) ABSTRACT

A knee airbag housing assembly including a cover panel, a box case, and a lower panel. The cover panel has an upper support portion and a lower support portion extending transversely from a cantilevered support portion. A tear seam formed between the upper cover and lower cover portion. A lower support portion extends transversely from a cantilevered support on the lower cover portion of said cover panel. The box case supports an airbag module and has a lower wall with a distal end lower wall extending towards the cover panel. The box case is fitted in the space between the upper support and lower support portions such that the distal end lower wall of the box spring is disposed closer to the cantilevered support than the terminal edge of the lower panel.

7 Claims, 3 Drawing Sheets

KNEE AIRBAG HOUSING ASSEMBLY

BACKGROUND OF THE INVENTION

1. Field of the Invention

A knee airbag housing assembly housing a knee airbag module in a motor vehicle for preventing a lower panel of the housing assembly from being compromised during airbag deployment.

2. Description of the Prior Art

A knee airbag housing assembly of the type to which the subject invention pertains, having a cover panel with a tear seam through which an airbag deploys, a box case for supporting an airbag module, and a lower panel for instrument panel reinforcement is known. One such knee airbag housing assembly is illustrated in the Toyota Camry wherein the housing assembly includes a cover panel having an upper support portion extending transversely to an upper cover portion. The upper cover portion bends from the upper support portion and extends to a lower cover portion. The lower cover panel having a cantilevered support from which extends a lower support portion. A tear seam is formed between the upper cover portion and the lower cover portion. A lower support portion extends transversely from the cantilevered support.

The box case having a lower wall extending to a distal edge lower wall. The box case supports the airbag module and is housed in the space between the upper support and lower support portions of the cover panel, with the upper wall attached to the upper support and the lower wall attached to the lower support. A lower panel extends from a terminal edge adjacent the terminal free edge of the cover panel to a forward edge. The lower panel is disposed beneath and spaced apart from the lower support portion, such that the terminal edge of the lower panel extends at least as far as the distal edge lower wall of the box case.

SUMMARY OF THE INVENTION AND ADVANTAGES

A knee airbag assembly having a cover panel, a box case, and a lower panel. The box case having a lower wall extending to a distal edge lower wall, the distal edge lower wall being closer to a cantilevered support of a cover panel than a terminal edge of a lower panel and out of a path of exit from the box case. During airbag deployment, the box case is placed under pressure from the inflating airbag and bell mouths, meaning the open ends of the box case expand and thus the lower wall of the box case can come into contact and compromise the lower panel.

Therefore, the subject knee airbag assembly eliminates the possibility of the lower wall of the box case from compromising the lower panel by placing the distal edge lower wall of the box case closer to the cantilevered support of the cover panel than the terminal edge of the lower panel and out of a path of exit from the box case. In other words, this arrangement places the distal edge lower wall of the box case to the rear of the vertical plane of terminal edge of the lower panel with respect to the orientation of the motor vehicle. Accordingly, the distal edge lower wall of the box case extends beyond the terminal edge of the lower panel, and space is left therein to allow for the box case to bell mouth without compromising the lower edge panel.

DETAILED DESCRIPTION OF THE INVENTION

Figure 1:
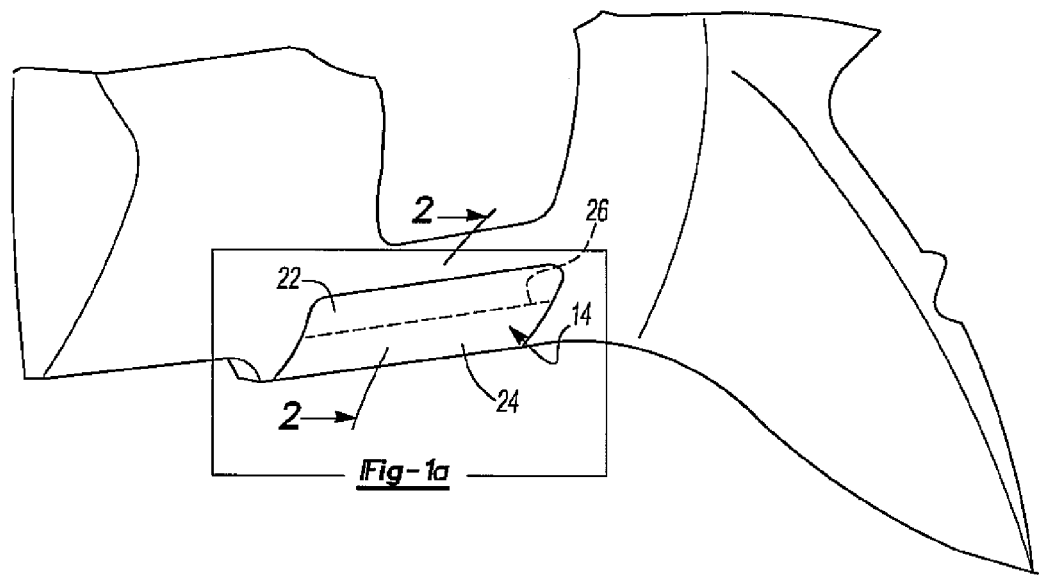
FIG. 1 is a perspective view of a knee airbag assembly knee airbag housing assembly characterized by a distal edge lower wall being closer to a cantilevered support than a terminal edge of a lower panel.
Figure 1A:
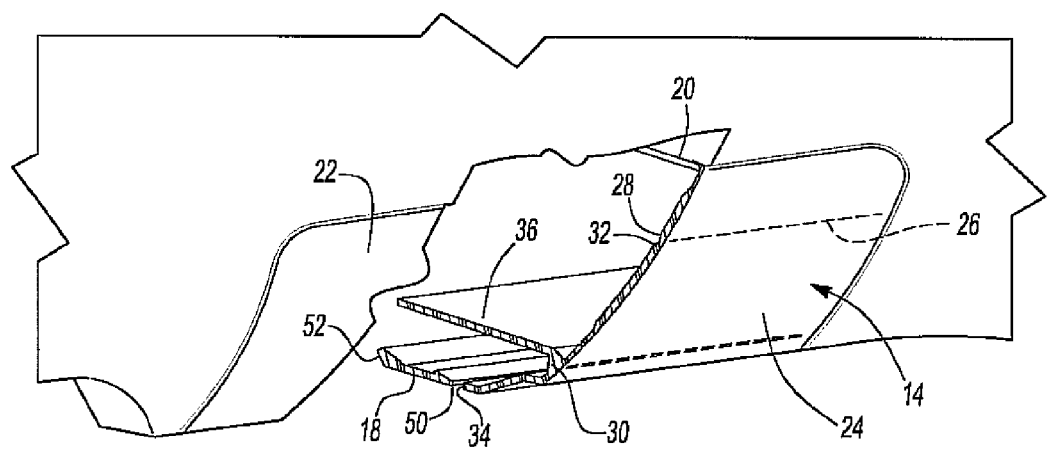
Figure 2:
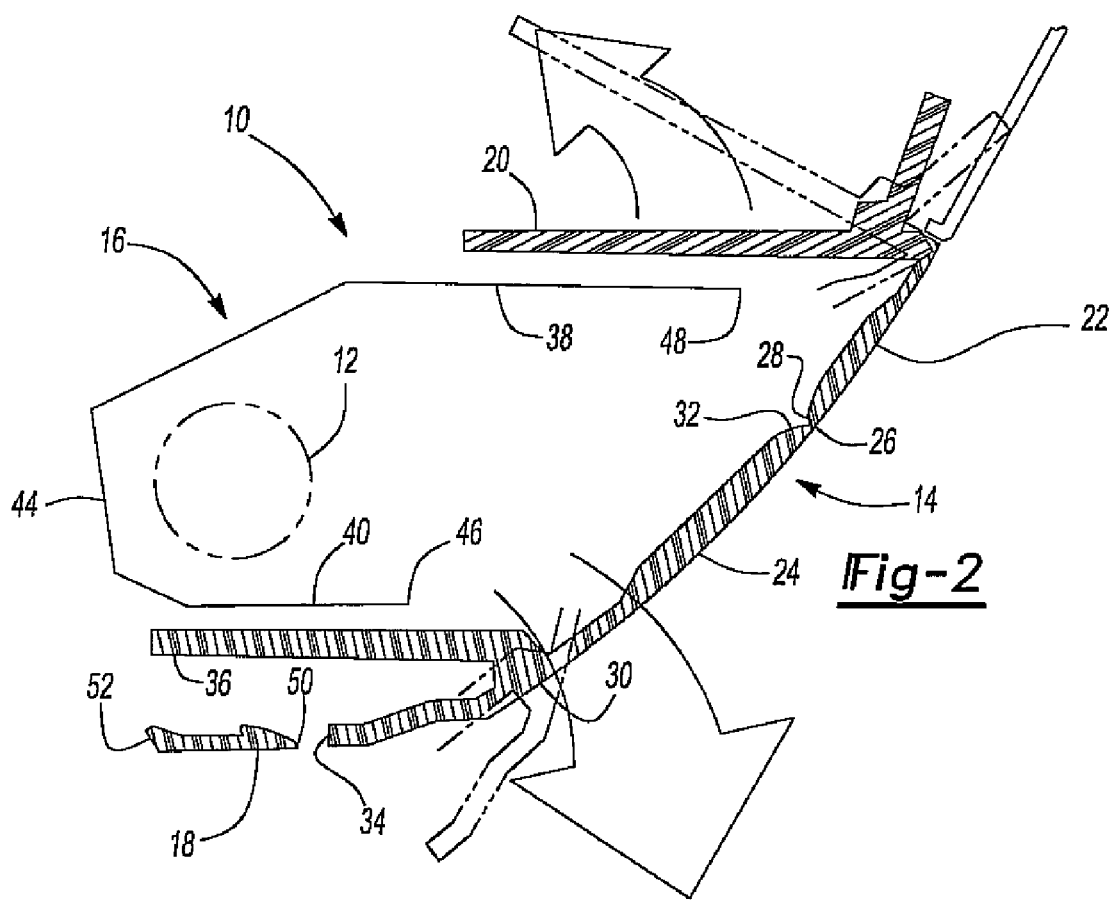
FIG. 2 is a cross-sectional view taken along lines 2-2 of FIG. 1.
Figure 3:
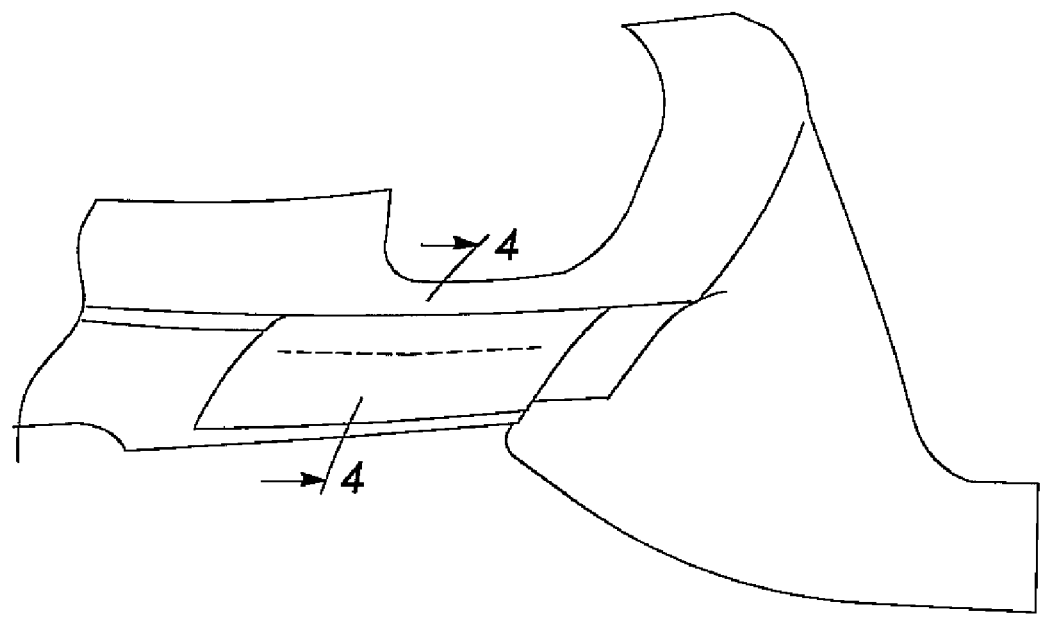
FIG. 3 is a perspective view of a conventional knee airbag assembly disclosed as prior art.
Figure 4:
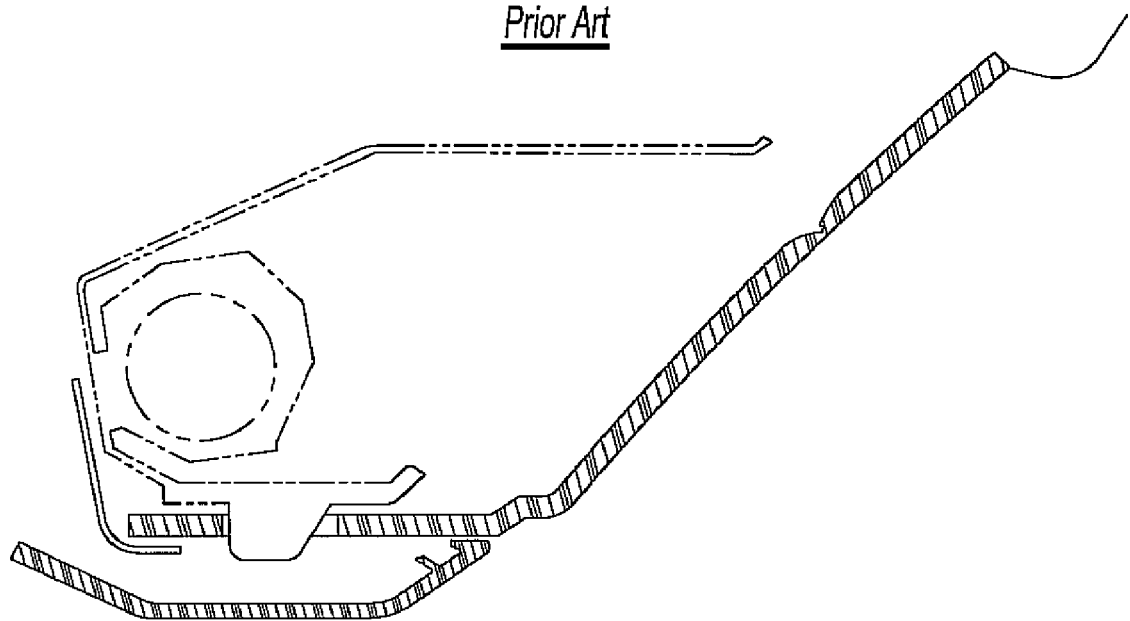
FIG. 4 is a cross-sectional view taken along lines 4-4 of FIG. 3.

Referring to the Figures, wherein like numerals indicate corresponding parts throughout the several views, a housing assembly 10 for supporting a knee airbag module 12 in a motor vehicle, the housing assembly 10, constructed in accordance with the subject invention is shown in FIGS. 1, 2, and 3.

The knee airbag housing assembly 10 includes a cover panel 14, a box case 16, and a lower panel 18. The cover panel 14 has an upper support portion 20, an upper cover portion 22, a lower cover portion 24, and a tear seam 26. The upper support portion 20 extends transversely to the upper cover portion 22. The upper cover portion 22 bends downward from the upper support portion 20 and extends to a lower edge 28. The lower cover portion 24 having a cantilevered support 30 begins at an upper edge 32 adjacent the lower edge 28 of the upper cover portion 22 and continues downward along an inwardly arcuate path to a terminal free edge 34. A tear seam 26 is disposed between the lower edge 28 of the upper cover portion 22 and the upper edge 32 of the lower cover portion 24. The cantilevered support 30 is located proximate the terminal free edge 34, and a lower support portion 36 extends transversely from the cantilevered support 30. The upper wall 38 is attached below and spaced apart from the upper support portion 20 and the lower wall 40 is attached above and spaced apart from the lower support portion 36. A lower panel 18 is disposed below and spaced apart from the lower support portion 36.

The box case 16 supports the airbag module, and has an upper wall 38 spaced apart from the lower wall 40, a pair of side walls (not shown) extending between the lower wall 40 and the upper wall 38, and a back wall 44 extending between the upper wall 38 and the lower wall 40 and the side walls. The lower wall 40 and the upper wall 38 each extend from the back wall 44 to distal edge lower wall 46 and distal edge upper wall 48 respectively, forming an opening. The upper wall 38 is longer than the lower wall 40, thus the distal edge upper wall 48 is further to the rear than distal edge lower wall 46 with respect to the motor vehicle.

The box case 16 is fitted in the space between the upper support portion 20 and lower support portion 36 of the cover panel 14 such that the upper wall 38 of the box case 16 is attached below and spaced apart from the upper support portion 20 of the cover panel 14, and the lower wall 40 of the box case 16 is attached above and spaced apart from the lower support portion 36 of the cover panel 14. The cover panel 14 is disposed transversely to and extends across distal edge upper wall 48 and distal edge lower wall 46 of the box case 16. A lower panel 18 extends from a terminal edge 50 adjacent the terminal free edge 34 of the cover panel 14 to a forward edge 52. The lower panel 18 is disposed beneath and spaced apart from the lower support portion 36. The distal edge lower wall 46 extends beyond the vertical plane of the terminal edge 50. Accordingly, distal edge lower wall 46 of the box case 16 is closer to the cantilevered support 30 of the cover panel 14 than the terminal edge 50 of the lower panel 18 and out of a path of exit from the box case 16.

Obviously, many modifications and variations of the present invention are possible in light of the above teachings and may be practiced otherwise than as specifically described while within the scope of.

The invention claimed is:

1. A housing assembly for supporting a knee airbag module in a motor vehicle, the housing assembly comprising:
   a box case for supporting the knee airbag module, the box case having a lower wall and a back wall having a proximal edge, the lower wall connected to the proximal edge of the back wall and extending along an axis to a distal edge, the distal edge lying on a same plane as the proximal edge, and an opening;
   a cover panel disposed over the opening, the cover panel having a tear seam formed therein, the cover panel extending to a terminal free edge and having a cantilevered support and a lower support, the lower support extending from the cantilevered support towards the box case, the lower support spaced apart from the distal edge and beneath the lower wall; and
   a lower panel attached to a vehicle body, the lower panel spaced apart from and below the lower support, the lower panel extending from the vehicle body towards the cover panel to a terminal edge, the terminal edge spaced apart from the terminal free edge of the cover panel, the distal edge of the lower wall extending beyond the terminal edge of the lower panel so as to be closer to the cantilevered support than the terminal edge of the lower panel.

2. The housing assembly as set forth in claim 1, wherein the box case further includes an upper wall spaced apart from the lower wall, a pair of side walls extending between the lower wall and the upper wall, the lower wall and the upper wall each extend from the back wall to a respective distal edge, and the back wall extends between the upper wall, the lower wall, and the side walls.

3. The housing assembly as set forth in claim 2, wherein a distance between the back wall and the distal edge of the upper wall is greater than a distance between the back wall and the distal edge of the lower wall.

4. The housing assembly as set forth in claim 1, wherein the cover panel further includes an upper support portion and an upper cover portion, the upper support portion extending from the upper cover portion so as to extend over a portion of the upper wall of the box case, and the upper cover portion extends from the upper support portion to a lower edge.

5. The housing assembly as set forth in claim 4, wherein the cover panel further includes a lower cover portion, the lower cover portion having an upper edge adjacent the lower edge of the upper cover portion, and wherein the lower cover portion extends between the upper edge and the terminal free edge, and wherein the upper edge of the lower cover portion and the lower edge of the upper cover portion are joined so as to define the tear seam.

6. The housing assembly as set forth in claim 5, wherein the lower support portion extends from the cover portion so as to extend between the lower wall of the box case and the lower panel.

7. The housing assembly as set forth in claim 6, wherein a portion of the lower cover portion extends from the cantilevered support to the terminal free edge and is angled relative to the cantilevered support, and a length of the portion of the lower cover portion extending from the cantilevered support is no less than one-third of a length of the lower wall of the box case.

* * * * *